(12) United States Patent
Li et al.

(10) Patent No.: US 9,252,582 B2
(45) Date of Patent: Feb. 2, 2016

(54) PLUG-IN TYPE BUS BAR

(75) Inventors: Jing Li, Zhejiang (CN); Xiangrong Liu, Zhejiang (CN)

(73) Assignee: YUEQING GAOKE ENVIRONMENTAL CO., LTD., Zhejiang (CN)

( * ) Notice: Subject to any disclaimer, the term of this patent is extended or adjusted under 35 U.S.C. 154(b) by 372 days.

(21) Appl. No.: 13/981,778

(22) PCT Filed: Jul. 26, 2011

(86) PCT No.: PCT/CN2011/001225
§ 371 (c)(1),
(2), (4) Date: Aug. 2, 2013

(87) PCT Pub. No.: WO2012/100395
PCT Pub. Date: Aug. 2, 2012

(65) Prior Publication Data
US 2013/0306369 A1 Nov. 21, 2013

(30) Foreign Application Priority Data
Jan. 27, 2011 (CN) .......................... 2011 1 0030414

(51) Int. Cl.
*H02G 5/00* (2006.01)
*H02B 1/20* (2006.01)

(52) U.S. Cl.
CPC . *H02G 5/00* (2013.01); *H02B 1/205* (2013.01)

(58) Field of Classification Search
USPC .................................. 174/68.1; 439/213, 660
See application file for complete search history.

(56) References Cited

U.S. PATENT DOCUMENTS

2001/0027872 A1* 10/2001 Wagener .................. H02G 5/00
174/71 B
2003/0049971 A1* 3/2003 Mercader ............. H01R 9/2458
439/660

FOREIGN PATENT DOCUMENTS

| CN | 2381051 Y |   | 5/2000 |
|----|-----------|---|--------|
| CN | 2452174 Y |   | 10/2001 |
| CN | 2658983 Y | * | 11/2004 |
| CN | 101465529 A | * | 6/2009 |

(Continued)

OTHER PUBLICATIONS

International Search Report issued in PCT/CN2011/001225 mailed Oct. 13, 2011 (6 pages).

(Continued)

*Primary Examiner* — William H Mayo, III
*Assistant Examiner* — Krystal Robinson
(74) *Attorney, Agent, or Firm* — Osha Liang LLP

(57) ABSTRACT

A plug-in type busbar for connecting with a relay or a breaker includes an insulating housing and a plurality of conductive busbar parts insulated from each other in the insulating housing. Two interface sets are provided on two ends of the busbar respectively. One interface set on one end of one busbar can be inserted in the other interface set of the other bus bar. The busbar is connectable with adjacent busbars through the interface sets at both ends thereof. At least an electrical connection is formed between the adjacent two busbars after the adjacent two busbars are inserted each other. When a longer busbar is demanded, an extended structure can be obtained by simply connecting two busbars together, and a connection of the busbars can be completed by connecting the insulating housing in a plugged manner.

19 Claims, 5 Drawing Sheets

(56) References Cited

FOREIGN PATENT DOCUMENTS

| | | |
|---|---|---|
| DE | 102 05 101 A1 | 8/2003 |
| JP | 9-271113 A | 10/1997 |

OTHER PUBLICATIONS

Espacenet Abstract, Publication CN2658983Y dated Nov. 24, 2004 (1 page).

Espacenet Abstract, Publication CN101465529A dated Jun. 24, 2009 (1 page).

Espacenet Abstract, Publication CN2381051Y dated May 31, 2000 (1 page).

Espacenet Abstract, Publication CN2452174Y dated Oct. 3, 2001 (1 page).

Espacenet Abstract, Publication DE10205101A1 dated Aug. 21, 2003 (2 pages).

* cited by examiner

PLUG-IN TYPE BUS BAR

CROSS REFERENCE TO RELATED APPLICATIONS

This is a national stage application based on PCT/CN2011/001225, filed on Jul. 26, 2011, which claims priority to Chinese Patent Application No. 201110030414.5, filed on Jan. 27, 2011. This application claims the priority of these prior applications and incorporates their disclosures by reference in their entireties.

FIELD OF INVENTION

The present invention relates to a busbar adapted for being connected with a relay or a circuit breaker, especially relates to a plug-in type busbar.

BACKGROUND OF THE INVENTION

A busbar is a rectangular copper bar, adapted for being connected to a power source, performing as a connector through which various relays and circuit breakers can be connected together.

As shown in FIG. 1, the busbar in the prior art comprises three busbar parts and an insulating housing enclosing the busbar parts. Each busbar part comprises a connector base made from electrically conductive materials, and electrically conductive connectors which are integrally formed on one side of the connector base. The connector bases are plugged into the grooves of the housing and are insulated from each other, and the connectors extend out of the housing. The connectors respectively formed on each of the connector bases are arranged in a staggered form, and three adjacent connectors individually formed on a different connector base can be used for being connected with the three-phase plugs of a relay or a circuit breaker. The end portion of the housing is provided with a cap in order to prevent the connector base from slipping out of the housing and prevent current leakage of the connector base. The busbar can generally meet the requirements for confluence, however, when an busbar with an extended length is required, the existing busbar may not meet the requirement as its length is fixed. During practical application process, busbars with different length are needed and should be prepared for different extension scale, not only increasing the cost bust also occupying a larger space, and also wasting materials. On the other hand, in order to plug in a plurality of busbar parts, it is necessary to process the insulating material to obtain a housing shape. Due to the impact of processing art, the temperature resistant capacity of the insulating housing can only reach up to about 70☐, while when the busbar is in use, a large amount of heat will be generated due to the current passing through the copper parts, and the housing with such a structure can not resist high temperature, therefore affecting the service life thereof.

Chinese patent CN2658983Y discloses a busbar structure for a switchboard. The busbar is integrally formed, comprising an end body base and a plurality of connectors integrally formed on two sides of the body. Several busbars are arranged in an overlapped manner with connectors of each busbar arranged in a staggered form, and the body of the busbar is coated with an insulating layer. When the length of the busbar body is not adequate for use, the busbar can be used to connect with another busbar by riveting or locking their end portions together, and then used after being coated with an insulating layer. Although the busbars can be assembled to form an extended structure by connecting their end portions together, the connection of their end portions is realized by riveting or locking, which is complex and time-consuming; on the other hand, thus obtained connected busbars need further treatment in order to keep the busbars insulated from each other, and also need further treatment to coat the whole structure of the connected busbars, so it is required to prepare insulating housing with different length, which causes waste of material; besides, the whole assembling procedure is relatively complex.

SUMMARY OF THE INVENTION

In view of the above-described problem, it is one objection of the present invention to solve the problem that the busbar in the prior art has a complex structure and needs complex steps to obtain an extended structure by connecting them with each other, and thus provides a plug-in type busbar which has a simple structure and is easy and simple to be connected and assembled.

To achieve the above objectives, in accordance with one embodiment of the invention, provided is a plug-in type busbar comprising an insulating housing; a plurality of busbar parts made of conductive materials, disposed inside the insulating housing and insulated from each other; wherein, each of the busbar parts comprises a connector base and a plurality of connectors which are integrally formed on one side of the connector base and extend out of the insulating housing for being electrically connectable in the of form of a connector set to an electrical appliance, and the connector set is formed by adjacently arranged connectors respectively connecting with an individual connector base; the busbar, comprising a first end and a second end, is provided with two pluggable interface sets respectively disposed at each end, the interface set at the first end is provided with a structure that is adapted for being connected with the interface set at the second end in a plugged manner, the busbar is connectable with another two busbars through the interface sets at both ends thereof; an electrical connection is formed between two connector sets of two adjacent busbars after busbars are connected together.

In a class of this embodiment, the connector set comprises a first connector set disposed close to the interface set at first end, a second connector set disposed closed to the interface set at the second end, and an intermediate connector set disposed on the middle segment of the connector base; the connectors of the first connector set are spaced apart from each other in the longitudinal direction of the busbar; the connectors of the second connector set have the corresponding arrangement with that of the connectors of the first connector set, and each two adjacent connectors of the first connector set and the second connector set formed on the same connector base are spaced apart with each other in the direction of thickness of the connector; after two busbars are connected together by one busbar being plugged in another, each connector of the first connector set on one busbar part is only connected in an overlapped manner with a connector of the second connector set of a corresponding busbar part of an adjacent busbar, and in the direction that two connectors approach to each other, the difference between the deviation of one connector from the connector base and that of the other connector from the connector base is equal to the thickness of a corresponding connector.

In a class of this embodiment, after two busbar are connected together, the tops of connectors of the first connector set and that of corresponding connectors of the second connector set on the connector base are in contact with each other.

In a class of this embodiment, the connector base comprises a flat segment and a staggered segment, the first connector set is formed on the staggered segment, the second connector set and the intermediate connector sets are formed on the flat segment; and each two connector bases are electrically insulated with each other, after connected together in an overlapped manner.

In a class of this embodiment, the length of the staggered segment of the connector base located in a lower layer is longer than the length of the staggered segment of the connector base located in an upper layer.

In a class of this embodiment, each of the connectors is perpendicular to the connector base; the difference between the distance that each connector of the first connector set deviates from the connector base and the distance that each corresponding connector of the second connector set deviates from the connector base is equal to the thickness of the connector.

In a class of this embodiment, each of the connectors is parallel to the connector base; the difference between the distance that each connector of the first connector set deviates from the connector base and the distance that each corresponding connector of the second connector set deviates from the connector base is equal to the thickness of the connector.

In a class of this embodiment, step-shaped ends of the busbar are formed after busbar parts are arranged in an overlapped manner, and the two interface sets disposed at two ends of the insulating housing are respectively provided with a step-shaped connecting structure.

In a class of this embodiment, the end portions of the step-shaped connecting structures have tongues and grooves formed thereon.

In a class of this embodiment, each of the tongues is dovetail shaped; and each of the grooves is also dovetail shaped, adapted for allowing a corresponding tongue to be plugged in.

In a class of this embodiment, the busbar comprises a first busbar part, a second busbar part and a third busbar part; the interface set at the first end of the busbar comprises three tongues, which comprise a first tongue, a second tongue and a third tongue, all of which projects towards an adjacent busbar after two busbars are connected together; and the interface set further comprises a first groove, located between the first tongue and the second tongue; a second groove, located between the second tongue and the third tongue; and a third groove, located on one side of the first tongue far away from the second groove; the first tongue is adapted for being plugged in the second groove in an engaged manner, the second tongue is adapted for being plugged in the first groove in an engaged manner, and the third tongue is adapted for being plugged in the third groove in an engaged manner; the interface set at the second end of the busbar comprises four tongues, in which a fourth tongue projecting towards an adjacent busbar after two busbars are connected together is arranged on one side of the first tongue close to the third groove, and the third groove is located between the fourth tongue and the first tongue.

In a class of this embodiment, the busbar comprises a first busbar part, a second busbar part, a third busbar part and a fourth busbar part; the first interface set at the first end of the busbar comprises four tongues, which comprise a first tongue, a second tongue, a third tongue and a fourth tongue, all of which projects towards an adjacent busbar after two busbars are connected together; and the first interface set further comprises a first groove, located between the first tongue and the second tongue; a second groove, located between the second tongue and the third tongue; a third groove, located between the third tongue and the fourth tongue; a fourth groove, located on one side of the first tongue far away from the second groove; the first tongue is adapted for being plugged in the third groove in an engaged manner, the second tongue is adapted for being plugged in the second groove in an engaged manner, the third tongue is adapted for being plugged in the first groove in an engaged manner, and the fourth tongue is adapted for being plugged in the fourth groove in an engaged manner; the interface set at the second end of the busbar comprises five tongues, in which a fifth tongue projecting towards an adjacent busbar after two busbars are connected together, is arranged on one side of the first tongue close to the fourth groove, and the fourth groove is located between the fifth tongue and the first tongue.

In a class of this embodiment, the busbar comprises a first busbar part and a second busbar part; the interface set at the first end of the busbar comprises two tongues, which comprises a first tongue and a second tongue, both of which projects towards an adjacent busbar after two the busbars are connected together; and the interface set further comprises a first groove, located between the first tongue and the second tongue; and a second groove, located on one side of the first tongue far away from the second groove; the first tongue is adapted for being plugged in the first groove in an engaged manner, and the second tongue is adapted for being plugged in the second groove in an engaged manner; the interface set at the second end of the busbar comprises three tongues; in which a third tongue projecting towards an adjacent busbar after two busbars are connected together, is arranged on one side of the first tongue close to the second tongue, and the second groove is located between the third tongue and the first tongue.

In a class of this embodiment, the connectors extend out of the insulating housing of the busbar in the same direction with tops of the connectors in the same level.

In a class of this embodiment, the insulating housing is fatled by plastic molding, and the insulating housing has a heat sink formed thereon.

Advantages of the invention comprise:

1. The busbar of the present invention is provided with interface sets on the two ends thereof, and the interface set comprises a plurality of tongues and grooves, so that when a longer busbar is needed in use, an extended structure can be obtained by connecting two busbars together in a plugged manner, which is simple and easy to carry out; besides, the busbars can be connected with each other by connecting the insulating housing in a plugged manner, thus avoiding a demand of an insulating process after the connection of the busbars, saving time and labor. Therefore in practical applications, busbars with unified size may help to obtain an extended busbar required in a specific occasion.

2. For the busbar of the present invention, an electrical connection between different busbars can be formed in the form of connector set and interface set, and during use, an extended structure and electrical connection can be obtained between busbars with different sizes if the busbars are provided with interface sets adapted for being connected with each other in a plugged manner and the connector sets are connected with each other in an overlapped manner, which may allow the busbars to be used in an electric circuit comprising relays and circuit breakers with different standards in practical applications, thus avoiding the demand of using the specific busbars for specific electric circuit.

3. The interface set is provide with tongues in a dovetail shape and grooves also in a dovetail shape adapted for allowing a corresponding tongue to be plugged in. Such arrangements can enhance the connection strengthen, and obtain a firm connection between the busbars, so as to avoid separation of connected busbars.

4. The insulating housing is formed by plastic molding, so the insulating housing is integrally formed with the busbar part, so as to avoid the separation of the insulating housing from the busbar part, and it is also easy to store.

5. The insulating housing is formed by molding, which enhances the high temperature resistant ability of the insulating housing, so as to enable the insulating housing to resist a temperature up to approximately 110☐, and further improving the service life of the busbar.

6. The insulating housing has a heat sink formed thereon, which allows easy heat dissipation, helps to prolong the service life of the busbar and ensure a good electric conductivity.

BRIEF DESCRIPTION OF THE DRAWINGS

In order to make the content of the present invention easier to be understood clearly, the invention will now be elucidated with the help of embodiments and drawings, wherein.

The numeral reference and related components appended drawing are provided as bellow:

1—insulating housing, 2—busbar part, 21—first busbar part, 22—second busbar part, 23 third busbar part, 24—fourth busbar part, 3—connector base, 31—first connector base, 32—second connector base, 33—third connector base, 34—fourth connector base, 41—first tongue, 42—second tongue, 43—third tongue, 44—fourth tongue, 45—fifth tongue, 51—first groove, 52—second groove, 53—third groove, 54—fourth groove, 6,61,62,63,64—connectors, 61A,62A,63A,64A—first connectors, 61B,62B,63B,64B—second connectors, 71—first protrusion, 72—second protrusion, 73—third protrusion, 74—fourth protrusion, 8—flat segment, 9—staggered segment.

DETAILED DESCRIPTION OF THE EMBODIMENTS

Figure 1:
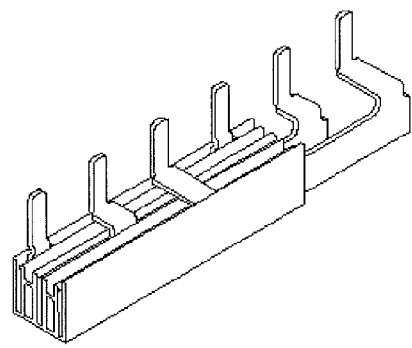
FIG. 1 is a structural view of a busbar of the prior art.
Figure 2:
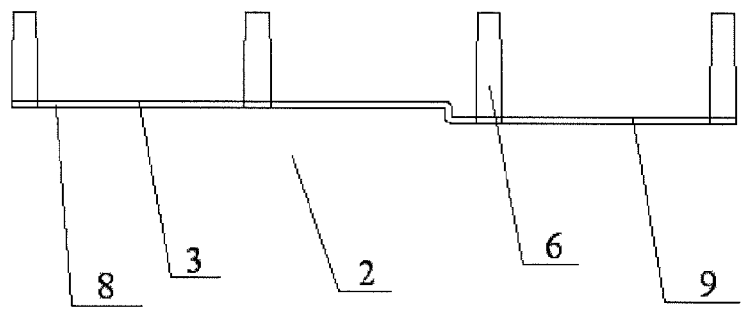
FIG. 2 is a structure view of a busbar of one embodiment of this invention.
Figure 3:
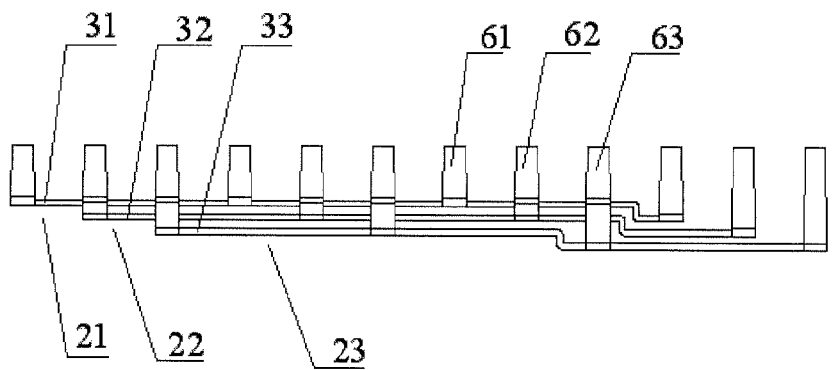
FIG. 3 is a view of the busbar parts of embodiment 1 of the present invention, which are arranged in an overlapped manner.
Figure 4:
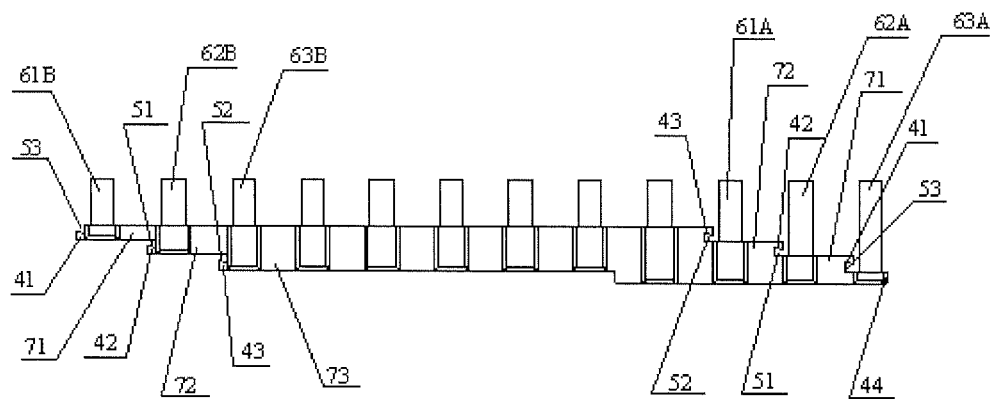
FIG. 4 is a structure view of a plug-in busbar of embodiment 1 of this invention.
Figure 5:
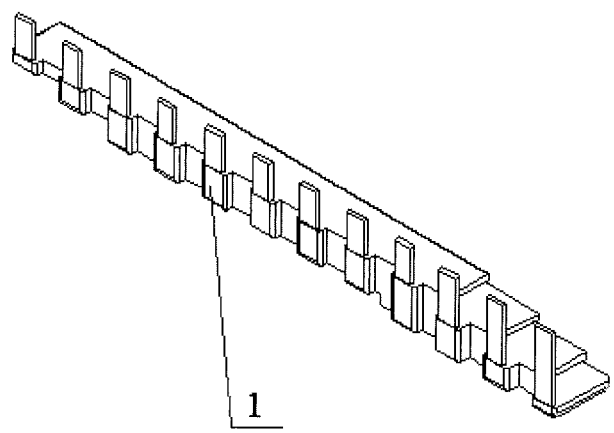
FIG. 5 is a three-dimensional view of a plug-in busbar of embodiment 1 of this invention.
Figure 6:
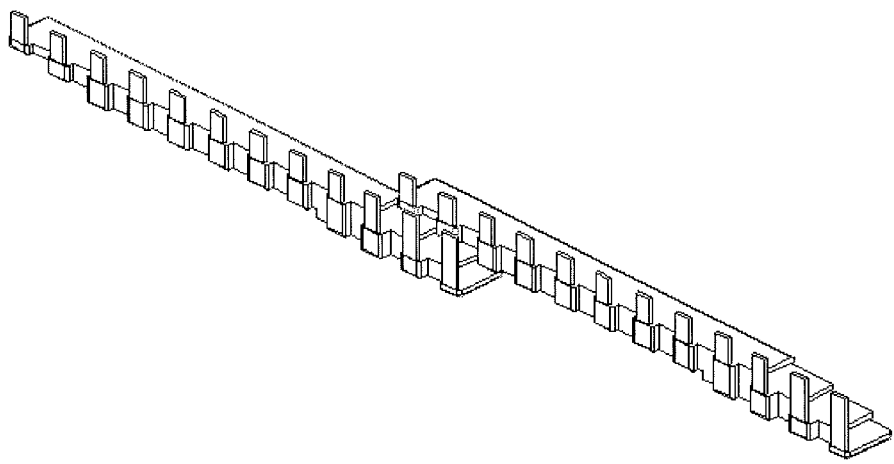
FIG. 6 is a view of the plug-in busbar of embodiment 1 of this invention in service condition.

As shown in FIG. 2 and FIG. 3, a plug-in busbar of the present invention comprises an insulating housing; a plurality of busbar parts 2 made of conductive materials, disposed inside the insulating housing 1 and insulated from each other; wherein, each of the busbar parts 2 comprises a connector base 3 and a plurality of connectors 6 which are integrally formed on one side of the connector base 3 and extend out of the insulating housing 1 for being electrically connectable in the form of a connector set to an electrical appliance, and the connector set herein is formed by adjacently arranged connectors 6 respectively connecting with an individual connector base 3. The electrical appliance is a relay or a circuit breaker. The busbar, comprising a first end and a second end, is provided with two pluggable interface sets respectively disposed at each end, and the busbar is connectable with another two busbars through the interface sets at both ends thereof; an electrical connection is formed between two connector sets of two adjacent busbars after busbars are connected together. The insulating housing is formed by plastic molding, and the insulating housing has a heat sink formed thereon.

The connector set comprises a first connector set disposed close to the interface set at the first end, a second connector set disposed closed to the interface set at the second end, and an intermediate connector set disposed on the middle segment of the connector base 3; the connectors of the first connector set are spaced apart from each other in the longitudinal direction of the busbar, which ensures that each two connectors are insulated from each other after adjacent busbars are connected with each other; the connectors of the second connector set have the corresponding arrangement to that of the connectors of the first connector set, which ensures that after the busbar parts are connected with each other, an electrical connection between the busbar parts arranged at the same corresponding position can be realized, but the busbar parts arranged at different positions are still insulated from each other. Each two adjacent connectors 6 of the first connector set and the second connector set formed on the same connector base 3 are spaced apart with each other in the direction of thickness of the connector, i.e. in the lateral direction of the busbar. After two busbars are connected together by one busbar being plugged in another, each connector of the first connector set on one busbar part is only connected in an overlapped manner with a connector of the second connector set of a corresponding busbar part of an adjacent busbar, and in the direction that two connectors approach to each other, the difference between the deviation of one connector from the connector base and that of the other connector from the connector base is equal to the thickness of a corresponding connector, which ensures that corresponding connectors 6 are connected with each other in an overlapped manner to form an electrical connection between adjacent busbars. After two busbar are connected together, the tops of connectors of the first connector set and that of corresponding connectors of the second connector set on the connector base 3 are in contact with each other, which ensures that a stable electrical connection can be realized between the busbars that are connected with each other in a plugged manner.

The connector base 3 comprises a flat segment 8 and a staggered segment 9, the first connector set is formed on the staggered segment 9, the second connector set and the intermediate connector sets are formed on the flat segment 8; the length of the staggered segment 9 of the connector base located in a lower layer is longer than the length of the staggered segment 9 of the connector base 3 located in an upper layer; each two connector bases 3 of a busbar are electrically insulated with each other, after being connected together in a overlapped manner. Because the length of the staggered segment 9 of each the connector base 3 is different from that of others, step-shaped ends of the busbar are formed after busbar parts are arranged in an overlapped manner, and further step-shaped end portions are formed after being coated by the insulating housing, and the two interface sets disposed at two ends of the insulating housing are respectively provided with a step-shaped connecting structures.

The interface sets with the step-shaped connecting structure are provided with a plurality of tongues, which together with a plurality of grooves are formed at the end portions of the step-shaped connecting structures. Each of the tongues is dovetail shaped; and each of the grooves is also dovetail shaped, adapted for allowing a corresponding tongue to be plugged in. When a first busbar is connected with a second busbar in a plugged manner, it is required to plug the first busbar into the second busbar from one side of the second busbar, thus obtaining a firm connection between the end portions, which may effectively avoid of separation.

Each of the connectors 6 is perpendicular to a the connector base 3; the difference between the distance that each connector of the first connector set deviates from the connector base 3 and the distance that each corresponding connector of the second connector set deviates from the connector base 3 is equal to the thickness of a connector.

Alternatively, each of the connectors 6 is parallel to the connector base 3; the difference between the distance that each connector of the first connector set deviates from the connector base 3 and the distance that each corresponding connector of the second connector set deviates from the connector base 3 is equal to the thickness of the connector.

The connectors 6 extend out of the insulating housing 1 of the busbar in the same direction with tops of the connectors 6 staying at the same level.

Embodiment 1

As shown in FIG. 3 to FIG. 6, the busbar of this embodiment comprises an insulating housing 1, and busbar parts 2 made of conductive materials and disposed inside the insulating housing 1. The busbar parts 2 comprises a first busbar part 21 comprising a first connector base 31, a second busbar part 22 comprising a second connector base 32, and a third busbar part 23 comprising a third connector base 33; the first connector base 31, the second connector base 32 and the third connector base 33 are arranged in an overlapped manner and has an insulating layer provided between them.

The busbar has an interface set located at a first end thereof and comprising three tongues, and has another interface set located at a second end thereof and comprising four tongues. Wherein, the three tongues comprise a first tongue 41, a second tongue 42 and a third tongue 43, all of which projects towards an adjacent busbar after two busbars are connected together. A first groove 51 is formed between the first tongue 41 and the second tongue 42; a second groove 52 is formed between the second tongue 42 and the third tongue 43; a third groove 53 is formed on one side, far away from the second groove 52, of the first tongue 41; the first tongue 41 is adapted for being plugged in the second groove 52 in an engaged manner, the second tongue 42 is adapted for being plugged in the first groove 51 in an engaged manner, and the third tongue 43 is adapted for being plugged in the third groove 53 in an engaged manner. The four tongues further has a fourth tongue 44 which projects towards an adjacent busbar after two busbars are connected together and is arranged on one side, close to the third groove 53, of the first tongue 41, and the third groove 53 is located between the fourth tongue 44 and the first tongue 41.

When two busbars are connected with each other in a plugged manner, the first, second and third tongues of the interface set at the first end of one busbar are respectively plugged into the second, first and third grooves of the interface set at the second end of the other busbar, and the fourth tongue 44 of the interface set at the second end of the other busbar can be used as a balancing base for the busbars connected with each other in the plugged manner.

The busbar is provided with first connectors 61A, 62A and 63A formed on the second end of the busbar and individually located on the first busbar part 21, the second busbar part 22 and the third busbar part 23, and second connectors 61B, 62B and 63B formed on the first end of the busbar and individually located on the first busbar part 21, the second busbar part 22 and the third busbar part 23; after a first busbar is connected with a second busbar in a plugged manner, the first connector 61A of the first busbar part 21 of the first busbar is electrically connected with the second connector 61B of the first busbar part 21 of the second busbar, the first connector 62A of the second busbar part 22 of the first busbar is electrically connected with the second connector 62B of the second busbar part 22 of the second busbar, and the first connector 63A of the third busbar part 23 of the first busbar is electrically connected with the second connector 63B of the third busbar part 23 of the second busbar. Therefore, an electrical connection between the two busbars can be realized by only simply connecting one busbar with another busbar in a plugged manner without any need of other operation. In addition, there is an intermediate connector set disposed between the first connector set and the second connector set.

The connector 61 of the first busbar part, the connector 62 of the second busbar part and the connector 63 of the third busbar part are spaced apart from each other, so that each three connectors of any connector set are adjacent and are individually formed on a respective busbar part. Therefore, when a relay or a circuit breaker is connected with the busbar, an electrical connection can be formed by connecting a three-phase plug of the relay or the circuit breaker with any adjacent three connectors, which is simple and easy to operate.

Furthermore, each of the connectors 6 is perpendicular to the connector base 3, and the connectors 6 are formed on the same side of the connector base 3; when the three busbar parts are arranged in an over lapped manner, a plurality of the connectors 6 are located on the same side of the busbar and extend out of the insulating housing 1 in the same direction with tops of the connectors 6 staying at the same level.

In order to simplify the structure and reduce the use of materials for producing insulating housing, in this embodiment, when the busbar parts are arranged in an overlapped manner, a flat segment of the first connector base 31 extends to the interior of a first protrusion 71 formed by the third groove 53 and the first tongue 41 at the first end of the busbar where the three tongues are formed, and a staggered segment of the first connector base 31 extends to the interior of a second protrusion 72 formed by the first groove 51 and the second tongue 42 at the second end of the busbar where the four tongues are formed; a flat segment of the second connector base 32 extends to the interior of a second protrusion 72 formed by the first groove 51 and the second tongue 42 at the first end of the busbar where the three tongues are formed, and a staggered segment of the second connector base 32 extends to the interior of a first protrusion 71 formed by the third groove 53 and the first tongue 41 at the second end of the busbar where the four tongues are formed; and a flat segment of the third connector base 33 extends to the interior of a third protrusion 73 formed by the second groove 52 and the third tongue 43 at the first end of the busbar where the three tongues are formed, and a staggered segment of the third connector base 33 extends to the interior of the fourth tongue 44 at the second end of the busbar where the four tongues are formed.

Embodiment 2

Figure 7:
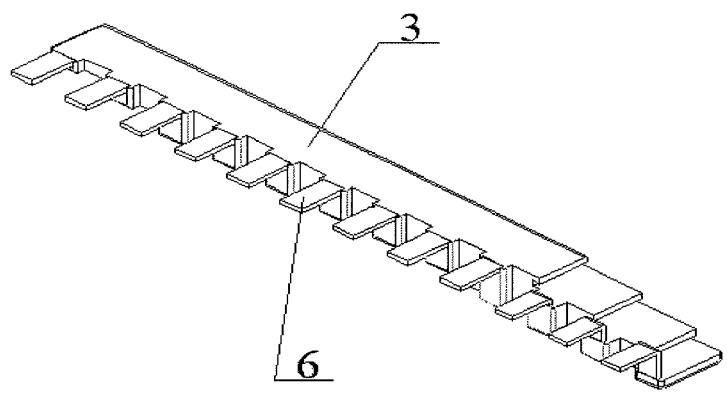
FIG. 7 is a three-dimensional view of a plug-in busbar in embodiment 2 of the present invention.

As shown in FIG. 7, the busbar in this embodiment has busbar parts that are arranged in an overlapped manner in the same way as that of the busbar in embodiment 1, and is provided with interface sets on both ends thereof, which are provided with the same structure as those of the busbar in embodiment 1. Compared with the busbar in embodiment 1, the difference between the busbars of this embodiment and embodiment 1 is that each of the connectors 6 in this embodiment is parallel to the connector base 3; the difference between the distance that each connector of the first connector set deviates from the connector base 3 and the distance that each corresponding connector of the second connector set deviates from the connector base 3 is equal to the thickness of the connector, which allows two busbars to engage with each other after they are connected together.

Embodiment 3

The busbar in this embodiment has busbar parts 2 which are provided with the same structure and are arranged in overlapped manner in the same way as that of the busbar in embodiment 1.

Figure 8:
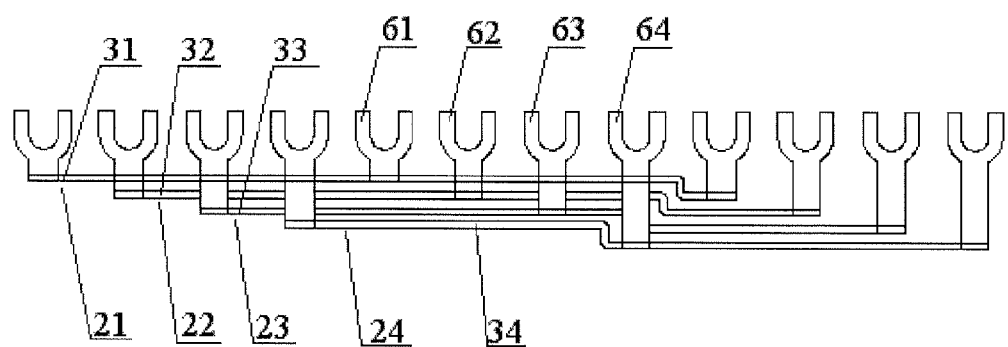
FIG. 8 is a view of the busbar parts of embodiment 3 of the present invention, which are arranged in an overlapped manner.
Figure 9:
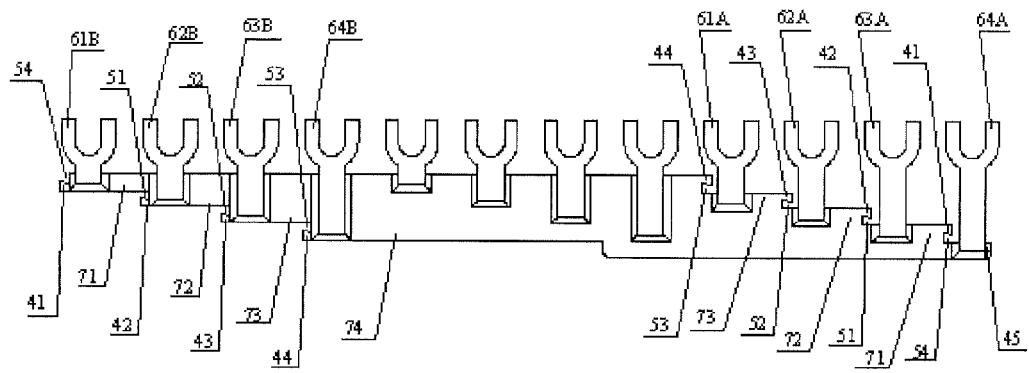
FIG. 9 is a structure view of a plug-in busbar of embodiment 3 of the present invention.

As shown in FIG. 8 and FIG. 9, the busbar of this embodiment comprises a first busbar part 21 comprising a first connector base 31, a second busbar part 22 which comprises a second connector base 32, a third busbar part 23 which comprises a third connector base 33, and a fourth busbar part 24 comprising a fourth connector base 34; the first connector base 31, the second connector base 32, the third connector base 33 and the fourth connector base 34 are arranged in an overlapped manner with an insulating layer provided between each two connector bases.

The busbar, comprising a first end and a second end, is provided with an interface set located at the first end and the interface set comprises four tongues. The four tongues comprise a first tongue 41, a second tongue 42, a third tongue 43 and a fourth tongue 44, all of which project towards an adjacent busbar after two busbars are connected together. A first groove 51 is formed between the first tongue 41 and the second tongue 42; a second groove 52 is formed between the second tongue 42 and the third tongue 43; a third groove 53 is formed between the third tongue 43 and the fourth tongue 44; a fourth groove is formed on one side, far away from the second groove 52, of the first tongue 41. The first tongue 41 is adapted for being plugged in the third groove 53 in an engaged manner, the second tongue 42 is adapted for being plugged in the second groove 52 in an engaged manner, the third tongue 43 is adapted for being plugged in the first groove 51 and the fourth tongue 44 is adapted for being plugged in the fourth groove 54 in an engaged manner.

The busbar has another interface set located at the second end and comprising five tongues. The five tongues further has a fifth tongue 45 which projects towards an adjacent busbar after two busbars are connected together and is arranged on one side of the first tongue 41, close to the fourth groove 54, with the fourth groove 54 located between the fifth tongue 45 and the first tongue 41.

When a first busbar is connected with a second busbar in a plugged manner, the first tongue 41, the second tongue 42, the third tongue 43 and the fourth tongue 44 of the interface set at the first end of the first busbar are respectively plugged into the fourth groove 54, the first groove 51, the second groove 52 and the third groove 53 of the interface set at the second end of the second busbar, and the fifth tongue 45 of the interface set at the second end of the second busbar can be used as a balancing base for the busbars connected in the plugged manner.

In order to simplify structure and reduce the use of material for producing insulating housing, in the present invention, when the busbar parts are arranged in an overlapped manner, the flat segment of the first connector base 31 extends to the interior of a first protrusion 71 formed by the fourth groove 54 and the first tongue 41 at the first end of the busbar where the four tongues are formed, and a staggered segment of the first connector base 31 extends to the interior of a third protrusion 73 formed by the second groove 52 and the third tongue 43 at the second end of the busbar where the five tongues are formed; and a flat segment of the second connector base 32 extends to the interior of a second protrusion 72 formed by the first groove 51 and the second tongue 42 at the first end of the busbar where the four tongues are formed, and a staggered segment of the second connector base 32 extends to the interior of a second protrusion 72 formed by the first groove 51 and the second tongue 42 at the second end of the busbar where the five tongues are formed; and a flat segment of the third connector base 33 extends to the interior of a third protrusion 73 formed by the second groove 52 and the third tongue 43 at the first end of the busbar where the four tongues are formed, and a staggered segment of the third connector base 33 extends to the interior of a first protrusion 71 formed by the fourth groove 54 and the first tongue 41; and a flat segment of the fourth connector base 34 extends to the interior of a fourth protrusion 74 formed by the third groove 53 and the fourth tongue 44 at the first end of the busbar where the four tongues are formed, and a staggered segment of the fourth connector base 34 extends to the interior of the fifth tongue 45 at the second end of the busbar where the five tongues formed.

In order to make it easy and simple to realize an electrical connection after the busbars are connected with each other in a plugged manner, the busbar of the present invention is provided with first connectors 61A, 62A, 63A and 64 A individually formed on the staggered segments of the first busbar part 21, the second busbar part 22, the third busbar part 23 and the fourth busbar part 24; and second connectors 61B, 62B, 63B and 64B individually formed on the flat segments of the first busbar part 21, the second busbar part 22, the third busbar part 23 and the fourth busbar part 24; after a first busbar is connected with a second busbar in a plugged manner, the first connector 61A of the first busbar part 21 of the first busbar is electrically connected with the second connector 61B of the first busbar part 21 of the second busbar, the first connector 62A of the second busbar part 22 of the first busbar is electrically connected with the second connector 62B of the second busbar part 22 of the second busbar, the first connector 63A of the third busbar part 23 of the first busbar is electrically connected with the second connector 63B of the third busbar part 23 of the second busbar, and the first connector 64A of the fourth busbar part 24 of the first busbar is electrically connected with the second connector 64B of the fourth busbar part 24 of the second busbar. Therefore, an electrical connection between two busbars can be formed by only simply connecting one busbar with another busbar in a plugged manner without any need of other operation.

Alternatively, the connectors 6 can also be in the form of a clip, so that it may be convenient to form a fixation through a screw pin or other fixing components after the busbar is connected with a relay or a circuit breaker in a plugged manner.

Furthermore, when the busbar parts 2 are arranged in an overlapped manner, the connector 61 formed on the first busbar part, the connector 62 formed on the second busbar part, the connector 63 formed on the third busbar part and the connector 64 formed on the fourth busbar part are spaced apart from each other, so that four connectors of any connector set are adjacent and are individually formed on a respective busbar part. Therefore, when a relay or a circuit breaker is connected with the busbar, an electrical connection can be formed by connecting a four-phase plug of the relay or the circuit breaker with any four adjacent connectors, which is simple and easy to operate.

Embodiment 4

The busbar in this embodiment has busbar parts 2 which is provided with the same structure and are arranged in overlapped manner in the same ways as that of the busbar in embodiment 1 and embodiment 2.

Figure 10:
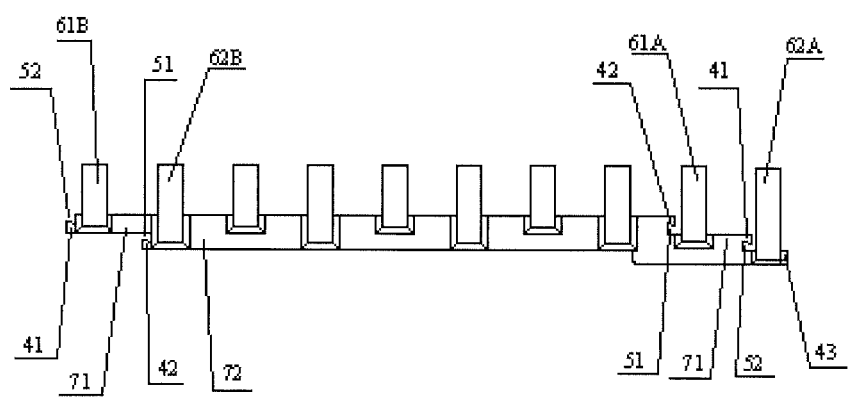
FIG. 10 is a structure view of a plug-in busbar of embodiment 4 of the present invention.

As shown in FIG. 10, the busbar of this embodiment comprises a first busbar part 21 comprising a first connector base 31, and a second busbar part 22 comprising a second connector base 32; the first connector base 31 and the second connector base 32 are arranged in an overlapped manner and has an insulating layer provided there between.

The busbar, comprising a first end and a second end, is provided with an interface set located at the first end and the interface set comprises two tongues. The two tongues comprise a first tongue 41 and a second tongue 42, both of which project towards an adjacent busbar after two busbars are connected together. A first groove 51 is formed between the first tongue 41 and the second tongue 42; a second groove 52 is formed on one side of the first tongue 41, far away from the first groove 51. The first tongue 41 is adapted for being plugged in the first groove 51 in an engaged manner, and the second tongue 42 is adapted for being plugged in the second groove 52 in an engaged manner.

The busbar has another interface set located at the second end and the interface set comprises three tongues. The three tongues further has a third tongue 43 which projects towards an adjacent busbar after two busbars are connected together and is arranged on one side of the first tongue 41, close to the second groove 52; the second groove 52 is located between the third tongue 43 and the first tongue 41.

When a first busbar is connected with a second busbar in a plugged manner, the first tongue 41 and the second tongue 42 of the interface set at the first end of the first busbar are respectively plugged into the first groove 51 and the second groove 52 of the interface set at the second end of the second busbar; the third tongue 43 of the interface set at the second end of the second busbar can be used as a balancing base for the busbars connected in the plugged manner.

In order to simplify the structure and reduce the use of material for producing insulating housing, in the present invention, when the busbar parts are arranged in an overlapped manner, a flat segment of the first connector base 31 extends to the interior of a first protrusion 71 formed by the second groove 52 and the first tongue 41 at the first end of the busbar where the two tongues are formed, and a staggered segment of the first connector base 31 extends to the interior of a first protrusion 71 formed by the second groove 52 and the first tongue 41 at the second end of the busbar where the three tongues are formed; and a flat segment of the second connector base 32 extends to the interior of a second protrusion 72 formed by the first groove 51 and the second tongue 42 at the first end of the busbar where the two tongues are formed, and a staggered segment of the second connector base 32 extends to the interior of the third tongue 43 at the second end of the busbar where the three tongues are formed.

In order to make it easy and simple to form an electrical connection after the busbars are connected with each other in a plugged manner, the busbar of the present invention is provided with first connectors 61A and 62A individually formed on the staggered segments of the first busbar part 21 and the second busbar part 22, and second connectors 61B and 62B individually formed on the flat segments of the first busbar part 21 and the second busbar part 22. After a first busbar is connected with a second busbar in a plugged manner, the first connector 61A of the first busbar part 21 of the first busbar is electrically connected with the second connector 61B of the first busbar part 21 of the second busbar, and the first connector 62A of the second busbar part 22 of the first busbar is electrically connected with the second connector 62B of the second busbar part 22 of the second busbar. Therefore, an electrical connection between two busbars can be formed by only simply connecting one busbar with another busbar in a plugged manner without any need of other operation.

Furthermore, when the busbar parts 2 are arranged in an overlapped manner, the connector 61 formed on the first busbar part and the connector 62 formed on the second busbar part are spaced apart from each other, so that two connectors of any connector set are adjacent and are individually formed on a respective busbar part. Therefore, when a relay or a circuit breaker is connected with the busbar, an electrical connection can be formed by connecting a two-phase plug of the relay or the circuit breaker with any two adjacent connectors, which is simple and easy to operate.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

The invention claimed is:

1. A plug-in type busbar comprising:
an insulating housing; a plurality of busbar parts made of conductive materials, disposed inside said insulating housing and insulated from each other; wherein, each of said busbar parts comprises a connector base and a plurality of connectors which are integrally formed on one side of said connector base and extend out of said insulating housing for being electrically connectable in the form of a connector set to an electrical appliance, and the connector set is formed by adjacently arranged connectors respectively connecting with an individual connector base; said busbar, comprising a first end and a second end, is provided with two pluggable interface sets respectively disposed at each end, the interface set at the first end is provided with a structure that is adapted for being connected with the interface set at the second end in a plugged manner, said busbar is connectable with another two said busbars through the interface sets at both ends thereof; an electrical connection is formed between two connector sets of two adjacent busbars after busbars are connected together; wherein, said connector set comprises a first connector set disposed close to the interface set at the first end, a second connector set disposed closed to the interface set at the second end, and an intermediate connector set disposed on the middle segment of said connector base; the connectors of said first connector set are spaced apart from each other in the longitudinal direction of said busbar; the connectors of said second connector set have the corresponding arrangement to that of the connectors of said first connector set, and each two adjacent connectors of said first connector set and said second connector set formed on the same connector base are spaced apart with each other in the direction of thickness of the connector; after two said busbars are connected together by one busbar being plugged in another, each connector of said first connector set on one busbar part is only connected in an overlapped manner with a connector of said second connector set of a corresponding busbar part of an adjacent busbar, and in the direction that two connectors approach to each other, the difference between the deviation of one connector and that of the other connector is equal to the thickness of a corresponding connector.

2. The busbar of claim 1, wherein,
after two busbar are connected together, the tops of connectors of said first connector set and that of corresponding connectors of said second connector set on the connector base are in contact with each other.

3. The busbar of claim 2, wherein,
said connector base comprises a flat segment and a staggered segment, said first connector set is formed on said staggered segment, said second connector set and said intermediate connector sets are formed on said flat segment; and each two connector bases are electrically insulated with each other, after connected together in an overlapped manner.

4. The busbar of claim 3, wherein,
each of said connectors is perpendicular to said connector base; the difference between the distance that each connector of said first connector set deviates from said connector base and the distance that each corresponding connector of said second connector set deviates from said connector base is equal to the thickness of said connector.

5. The busbar of claim 4, wherein,
step-shaped ends of said busbar are formed after busbar parts are arranged in an overlapped manner, and the two interface sets disposed at two ends of the insulating housing are respectively provided with a step-shaped connecting structures.

6. The busbar of claim 5, wherein,
the end portions of said step-shaped connecting structures have tongues and grooves formed thereon.

7. The busbar of claim 6, wherein,
each of said tongues is dovetail shaped; and each of said grooves is also dovetail shaped, adapted for allowing a corresponding tongue to be plugged in.

8. The busbar of claim 7, wherein,
said busbar comprises a first busbar part, a second busbar part and a third busbar part;
said interface set at the first end of said busbar comprises three tongues, which comprise a first tongue, a second tongue and a third tongue, all of which projects towards an adjacent busbar after two said busbars are connected together; and
said interface set further comprises
a first groove, located between said first tongue and said second tongue;
a second groove, located between said second tongue and said third tongue; and
a third groove, located on one side of said first tongue far away from said second groove;
said first tongue is adapted for being plugged in said second groove in an engaged manner, said second tongue is adapted for being plugged in said first groove in an engaged manner, and said third tongue is adapted for being plugged in said third groove in an engaged manner;
said interface set at the second end of said busbar comprises four tongues, in which a fourth tongue projecting towards an adjacent busbar after two busbars are connected together is arranged on one side of said first tongue close to said third groove, and said third groove is located between said fourth tongue and said first tongue.

9. The busbar of claim 7, wherein,
said busbar comprises a first busbar part, a second busbar part, a third busbar part and a fourth busbar part;
said first interface set at the first end of said busbar comprises four tongues, which comprise a first tongue, a second tongue, a third tongue and a fourth tongue, all of which projects towards an adjacent busbar after two said busbars are connected together; and
said first interface set further comprises
a first groove, located between said first tongue and said second tongue;
a second groove, located between said second tongue and said third tongue;
a third groove, located between said third tongue and said fourth tongue;
a fourth groove, located on one side of said first tongue far away from said second groove;
said first tongue is adapted for being plugged in said third groove in an engaged manner, said second tongue is adapted for being plugged in said second groove in an engaged manner, said third tongue is adapted for being plugged in said first groove in an engaged manner, and said fourth tongue is adapted for being plugged in said fourth groove in an engaged manner;
said interface set at the second end of said busbar comprises five tongues, in which a fifth tongue projecting towards an adjacent busbar after two busbars are connected together is arranged on one side of said first tongue close to said fourth groove, and said fourth groove is located between said fifth tongue and said first tongue.

10. The busbar of claim 7, wherein,
said busbar comprises a first busbar part and a second busbar part;
said interface set at the first end of said busbar comprises two tongues, which comprises a first tongue and a second tongue, both of which projects towards an adjacent busbar after two said busbars are connected together; and
said interface set further comprises
a first groove, located between said first tongue and said second tongue; and a second groove, located on one side of said first tongue far away from said second groove;
said first tongue is adapted for being plugged in said first groove in an engaged manner, and said second tongue is adapted for being plugged in said second groove in an engaged manner;
said interface set at the second end of said busbar comprises three tongues, in which a third tongue projecting towards an adjacent busbar after two busbars are connected together is arranged on one side of said first tongue close to said second tongue, and said second groove is located between said third tongue and said first tongue.

11. The busbar of claim 8, wherein:
said insulating housing is formed by plastic molding, and said insulating housing has a heat sink formed thereon.

12. The busbar of claim 3, wherein,
each of said connectors is parallel to said connector base; the difference between the distance that each connector of said first connector set deviates from said connector base and the distance that each corresponding connector of said second connector set deviates from the connector base is equal to the thickness of said connector.

13. The busbar of claim 12, wherein,
step-shaped ends of said busbar are formed after busbar parts are arranged in an overlapped manner, and the two interface sets disposed at two ends of the insulating housing are respectively provided with a step-shaped connecting structures.

14. The busbar of claim 13, wherein,
the end portions of said step-shaped connecting structures have tongues and grooves formed thereon.

15. The busbar of claim 14, wherein,
each of said tongues is dovetail shaped; and each of said grooves is also dovetail shaped, adapted for allowing a corresponding tongue to be plugged in.

16. The busbar of claim 15, wherein,
said busbar comprises a first busbar part, a second busbar part and a third busbar part;
said interface set at the first end of said busbar comprises three tongues, which comprise a first tongue, a second tongue and a third tongue, all of which projects towards an adjacent busbar after two said busbars are connected together; and
said interface set further comprises
a first groove, located between said first tongue and said second tongue;
a second groove, located between said second tongue and said third tongue; and
a third groove, located on one side of said first tongue far away from said second groove;
said first tongue is adapted for being plugged in said second groove in an engaged manner, said second tongue is adapted for being plugged in said first groove in an engaged manner, and said third tongue is adapted for being plugged in said third groove in an engaged manner;
said interface set at the second end of said busbar comprises four tongues, in which a fourth tongue projecting towards an adjacent busbar after two busbars are connected together is arranged on one side of said first tongue close to said third groove, and said third groove is located between said fourth tongue and said first tongue.

17. The busbar of claim 16, wherein:
said insulating housing is formed by plastic molding, and said insulating housing has a heat sink formed thereon.

18. The busbar of claim 15, wherein,
said busbar comprises a first busbar part, a second busbar part, a third busbar part and a fourth busbar part;
said first interface set at the first end of said busbar comprises four tongues, which comprise a first tongue, a second tongue, a third tongue and a fourth tongue, all of which projects towards an adjacent busbar after two said busbars are connected together; and
said first interface set further comprises
a first groove, located between said first tongue and said second tongue;
a second groove, located between said second tongue and said third tongue;
a third groove, located between said third tongue and said fourth tongue;
a fourth groove, located on one side of said first tongue far away from said second groove;
said first tongue is adapted for being plugged in said third groove in an engaged manner, said second tongue is adapted for being plugged in said second groove in an engaged manner, said third tongue is adapted for being plugged in said first groove in an engaged manner, and said fourth tongue is adapted for being plugged in said fourth groove in an engaged manner;
said interface set at the second end of said busbar comprises five tongues, in which a fifth tongue projecting towards an adjacent busbar after two busbars are connected together is arranged on one side of said first tongue close to said fourth groove, and said fourth groove is located between said fifth tongue and said first tongue.

19. The busbar of claim 15, wherein,
said busbar comprises a first busbar part and a second busbar part;
said interface set at the first end of said busbar comprises two tongues, which comprises a first tongue and a second tongue, both of which projects towards an adjacent busbar after two said busbars are connected together; and
said interface set further comprises
a first groove, located between said first tongue and said second tongue; and a second groove, located on one side of said first tongue far away from said second groove;
said first tongue is adapted for being plugged in said first groove in an engaged manner, and said second tongue is adapted for being plugged in said second groove in an engaged manner;
said interface set at the second end of said busbar comprises three tongues, in which a third tongue projecting towards an adjacent busbar after two busbars are connected together is arranged on one side of said first tongue close to said second tongue, and said second groove is located between said third tongue and said first tongue.

* * * * *